(12) United States Patent
Swanson

(10) Patent No.: US 10,457,326 B2
(45) Date of Patent: Oct. 29, 2019

(54) VEHICLE TRAILER CONTROL SYSTEM WITH SPEED CONTROL

(71) Applicant: Continental Automotive Systems, Inc., Auburn Hills, MI (US)

(72) Inventor: Vaughn James Swanson, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 21 days.

(21) Appl. No.: 15/712,337

(22) Filed: Sep. 22, 2017

(65) Prior Publication Data

US 2018/0079451 A1 Mar. 22, 2018

Related U.S. Application Data

(60) Provisional application No. 62/398,300, filed on Sep. 22, 2016.

(51) Int. Cl.
| | |
|---|---|
| *B62D 13/06* | (2006.01) |
| *G05D 1/00* | (2006.01) |
| *B60W 30/18* | (2012.01) |
| *B60W 10/18* | (2012.01) |
| *B60W 10/06* | (2006.01) |
| *B60W 10/10* | (2012.01) |
| *B62D 15/02* | (2006.01) |
| *B60W 10/08* | (2006.01) |

(52) U.S. Cl.
CPC ............. *B62D 13/06* (2013.01); *B60W 10/06* (2013.01); *B60W 10/08* (2013.01); *B60W 10/10* (2013.01); *B60W 10/18* (2013.01); *B60W 30/18036* (2013.01); *B62D 15/0285* (2013.01); *G05D 1/0011* (2013.01); *B60W 2300/14* (2013.01); *B60W 2520/10* (2013.01); *B60W 2560/00* (2013.01); *B60W 2710/06* (2013.01); *B60W 2710/10* (2013.01); *B60W 2710/18* (2013.01); *B60W 2720/10* (2013.01); *G05D 2201/0213* (2013.01)

(58) Field of Classification Search
CPC ... B62D 13/06; B62D 15/0285; B60W 10/10; B60W 30/18036; B60W 10/18; B60W 10/06; B60W 2710/18; B60W 2520/10; B60W 2710/06; B60W 2710/10; B60W 2560/00; B60W 10/08; B60W 2720/10; B60W 2300/14; G05D 1/0011; G05D 2201/0213
USPC .......................................................... 701/2
See application file for complete search history.

(56) References Cited

U.S. PATENT DOCUMENTS

| | | | |
|---|---|---|---|
| 2013/0179038 A1 | 7/2013 | Goswami et al. | |
| 2014/0052337 A1 | 2/2014 | Lavoie et al. | |
| 2016/0039456 A1* | 2/2016 | Lavoie | B62D 15/027 701/41 |
| 2016/0096549 A1* | 4/2016 | Herzog | B62D 13/06 701/41 |
| 2017/0297620 A1* | 10/2017 | Lavoie | B62D 13/06 |

* cited by examiner

*Primary Examiner* — Brian P Sweeney

(57) ABSTRACT

A method of controlling a reverse speed of a vehicle includes receiving a command from an operator to begin an autonomous backup of the vehicle. The method also includes automatically controlling a powertrain and/or a brake system of the vehicle to regulate the vehicle to travel at a predetermined speed in reverse in response receiving the command from the operator.

11 Claims, 3 Drawing Sheets

VEHICLE TRAILER CONTROL SYSTEM WITH SPEED CONTROL

CROSS REFERENCE TO RELATED APPLICATION

This application claims the benefit of provisional patent application No. 62/398,300, filed Sep. 22, 2016, which is hereby incorporated by reference.

TECHNICAL FIELD

The technical field relates generally to automotive vehicles and more particularly to advanced driver assistance systems for automotive vehicles with trailers.

BACKGROUND

When backing a vehicle, and particularly when the vehicle is attached to a trailer, it is often difficult to control the desired speed of the vehicle. This is exasperated by hills, rough terrain, and the various load weights provided by a trailer. While vehicle speed control (i.e., cruise control) is well known for regular "forward" driving of vehicles, it is not useful for reverse operation of the vehicle, especially when a trailer is attached.

As such, it is desirable to present a driving assistance system for controlling the speed of a vehicle in reverse. In addition, other desirable features and characteristics will become apparent from the subsequent summary and detailed description, and the appended claims, taken in conjunction with the accompanying drawings and this background.

BRIEF SUMMARY

In one exemplary embodiment, a method of controlling a speed of a vehicle, includes receiving a command from an operator to begin an autonomous backup of the vehicle. The method also includes automatically controlling a powertrain and/or a brake system of the vehicle to regulate the vehicle to travel at a predetermined speed in reverse in response receiving the command from the operator.

In one exemplary embodiment, a system for controlling a vehicle includes a human machine interface ("HMI") configured to receive at least one command from an operator. The system also includes a processor in communication with the HMI and a powertrain and/or a brake system of the vehicle and configured to automatically control the engine and/or the brake system to regulate the vehicle to travel at a predetermined speed in reverse in response receiving the command from the operator.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

A system 100 and method 300 of controlling a vehicle 102 are disclosed and described herein.

Figure 1:
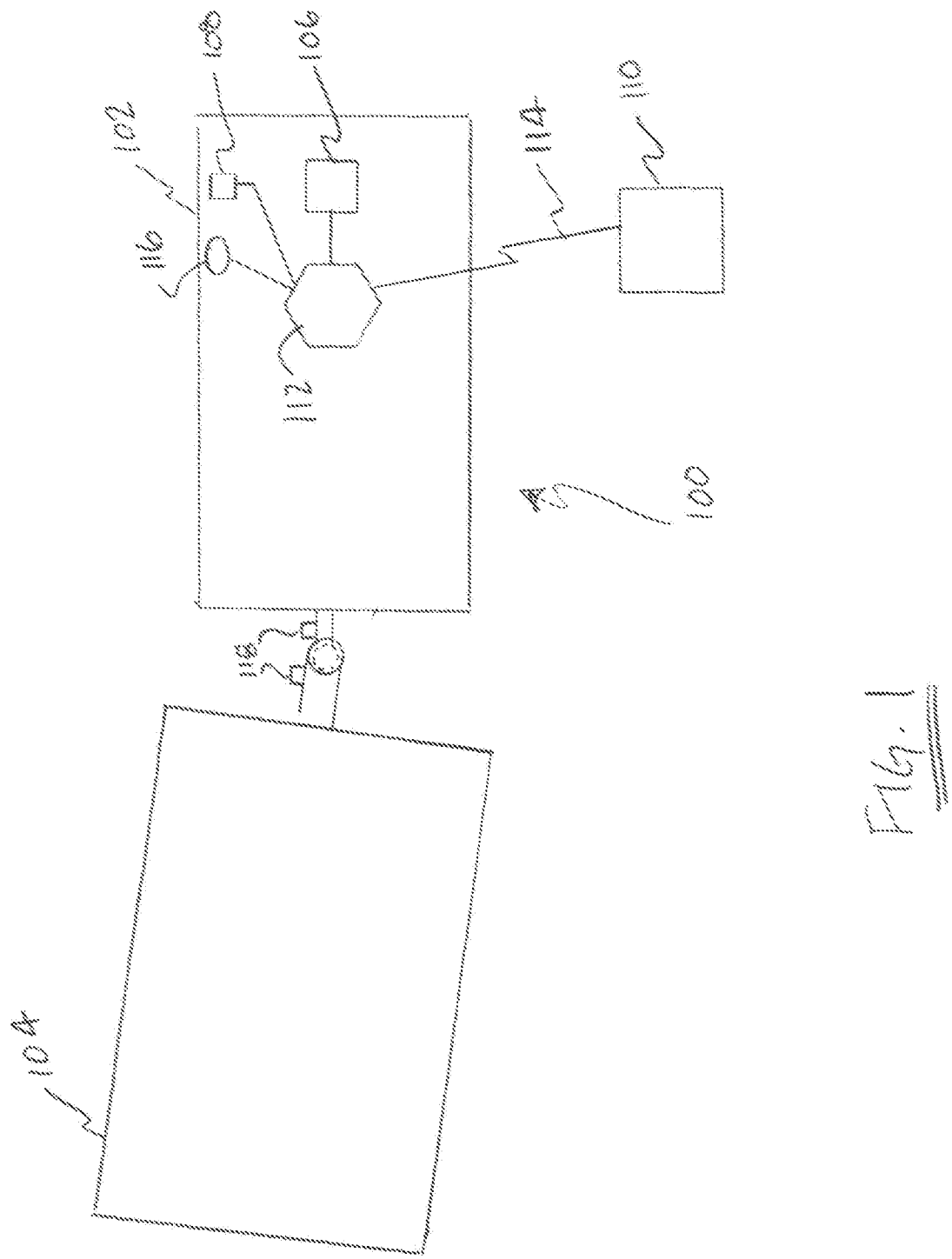
FIG. 1 is a block diagram of a system for controlling a vehicle connected to a trailer, according to one exemplary embodiment.

In one exemplary embodiment, as shown in FIG. 1, a trailer 104 is coupled to the vehicle 102. The vehicle 102 may include a powertrain 106 and/or a brake system 108, as appreciated by those skilled in the art. The powertrain 106 may include an engine (not shown) and a transmission (not shown), as also appreciated by those skilled in the art.

Figure 2:
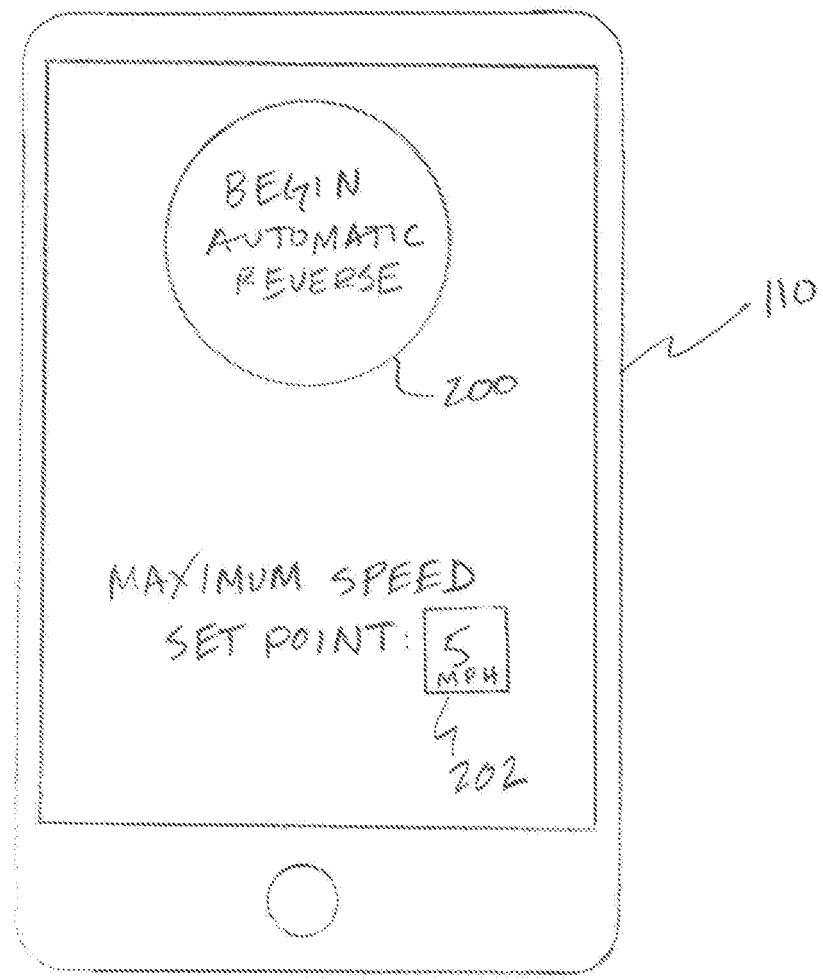
FIG. 2 is a block diagram of a human machine interface according to one exemplary embodiment.

The system 100 includes a human machine interface ("HMI") 110. The HMI 110 is configured to receive at least one command from an operator of the vehicle 102, e.g., the driver. In one example, this command may be a command to begin an autonomous backup of the vehicle 102 with the trailer 104 attached. The command may be given, for example, by pressing a button (not shown), activating a switch (not shown), or tapping a virtual "button" 200 on a touchscreen interface, as shown in FIG. 2. Of course, other apparatus and techniques for giving the command will be appreciated by those skilled in the art.

The system 100 also includes a processor 112. The processor 112 may be a microprocessor, microcontroller, application specific integrated circuit, and/or any other computing device capable of executing instructions and/or performing calculations. The processor 112 is configured to control one or more aspects of the powertrain 106 and/or the brake system 108 of the vehicle 102.

The processor 112 is in communication with the HMI 110. In one exemplary embodiment, the processor communicates with the HMI via a wireless communication link 114 (e.g., Bluetooth, WiFi, the cellular telephone network, etc.). However, a wired communication link (not shown) may alternatively and/or additionally be utilized to facilitate communication between the processor 112 and the HMI 110.

The system 100 may further include a speed sensor 116 in communication with the processor 112. The speed sensor 116 may detect the speed of the vehicle 102 by, for instance, monitoring rotation of one or more of the wheels (not shown) of the vehicle 102. Other techniques for detecting the speed of the vehicle 102 may be implemented, including, but not limited to, GPS tracking, radar, lidar, or a camera.

The system 100 may also include one or more attachment sensors 118 in communication with the processor 112 to detect the coupling of the trailer 104. That is, the one or more attachment sensors 118 detects whether or not the trailer is actually attached to the vehicle 102. Moreover, the one or more attachment sensors 118 may be configured to determine whether or the not the trailer 104 is correctly and/or properly attached to the vehicle 102. The one or more attachment sensors 118 may be coupled to the vehicle 102, the trailer 104, and/or a combination of the vehicle 102 and trailer 104. The one or more attachment sensors 118 may be implemented with cameras, proximity sensors, capacitive sensors, inductive sensors, and/or switches (none of which are shown) as appreciated by those skilled in the art.

Figure 3:
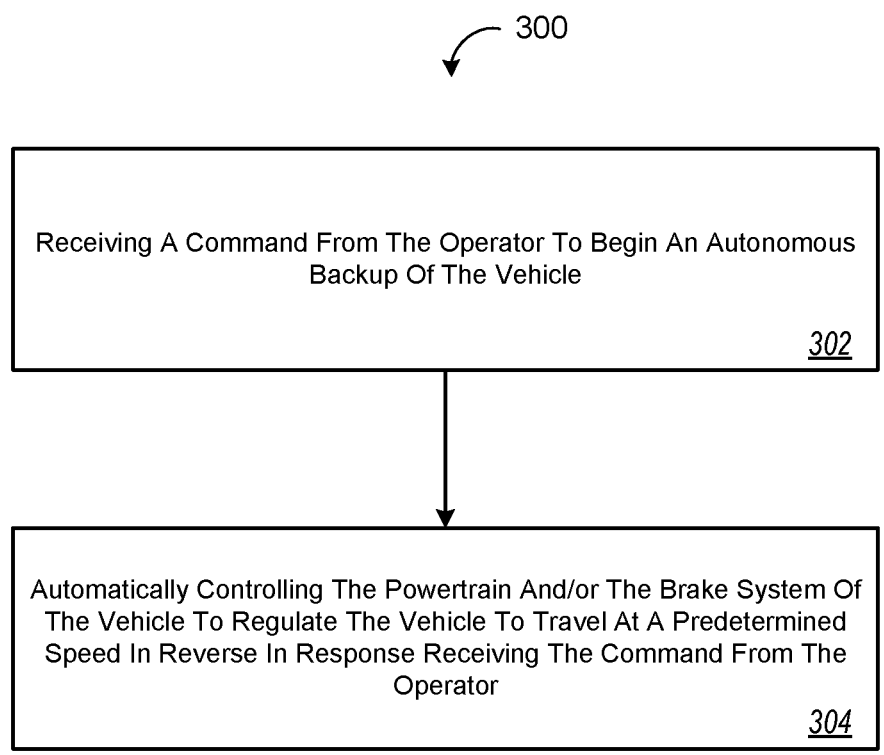
FIG. 3 is a flowchart showing a method of controlling speed of the vehicle according to one exemplary embodiment.

The method 300 of controlling the vehicle 102 is shown in FIG. 3. This method 300 may be implemented by utilizing the system 100 described above, including the processor 112 and/or HMI 110. However, it should be appreciated that other hardware devices (not shown) may be utilized to implement the method 300.

The method 300 includes, at 302, receiving a command from the operator to begin an autonomous backup of the vehicle. In the exemplary embodiment of the system 100 described above, the command from the operator is received by the processor 112 from the HMI 110.

The method 300 also includes, at 304 automatically controlling the powertrain 106 and/or the brake system 108 of the vehicle 102 to regulate the vehicle 102 to travel at a predetermined speed in reverse in response receiving the command from the operator. As such, the operator does not need to attempt to manually control the vehicle 102 peed while backing up with the trailer 104 attached. This is beneficial in numerous situations including, but not limited to, when the vehicle 102 and/or trailer 104 are on an incline, while on rough terrain, or when the vehicle 102 and/or trailer 104 are unfamiliar to the operator.

The automatic controlling of the powertrain 106 and/or brakes 108 may utilize the speed of the vehicle 102 sensed by the speed sensor. For example, a closed-control loop, e.g., a proportional-integral-derivative ("PID") control loop may be utilized.

The automatic controlling of the powertrain 106 and/or brake system 108 may also be limited to when attachment of the trailer 104 is detected by the at least one attachment sensor 118. That is, the system 100 and method 300 may not operate unless the trailer 104 is properly attached.

The method 300 may include receiving a backup speed set point from an operator. In an exemplary embodiment, as shown on FIG. 2, this set point may be received from the HMI as an input 202 from the operator. The method 300 may also include, defining the predetermined speed as the backup speed set point. As such, the operator may set the speed at which the vehicle 102 and trailer 104 travel during automated backup operation.

The present description has been described herein in an illustrative manner, and it is to be understood that the terminology which has been used is intended to be in the nature of words of description rather than of limitation. Obviously, many modifications and variations are possible in light of the above teachings. The invention may be practiced otherwise than as specifically described within the scope of the appended claims.

What is claimed is:

1. A method of controlling a speed of a vehicle, the method comprising:
   receiving, at a human machine interface ("HMI"), a command from an operator to begin an autonomous backup of the vehicle;
   receiving, at the HMI, a set point speed from the operator; and
   automatically controlling, from a processor in communication with the HMI, a powertrain and/or a brake system of the vehicle to regulate the vehicle to travel at the set point speed.

2. The method as set forth in claim 1, further comprising sensing a speed of the vehicle.

3. The method as set forth in claim 2, wherein automatically controlling the powertrain and/or the brake system of the vehicle utilizes a sensed speed of the vehicle.

4. The method as set forth in claim 1, further comprising detecting an attachment of a trailer.

5. The method as set forth in claim 4, wherein automatically controlling the powertrain is performed in response to receiving the commands from the operator and the detection of the attachment of the trailer.

6. A system for controlling a vehicle, comprising:
   a human machine interface ("HMI") configured to receive:
      a command from an operator to begin an autonomous backup of the vehicle, and
      a set point speed from the operator;
   a processor in communication with the HMI and a powertrain and/or a brake system of the vehicle, the processor configured to automatically control the engine and/or the brake system to regulate the vehicle to travel at the set point speed in reverse.

7. The system as set forth in claim 6, wherein the HMI is separate from the vehicle and in wireless communication with the processor.

8. The system as set forth in claim 6, further comprising a speed sensor in communication with the processor and configured to detect the speed of the vehicle.

9. The system as set forth in claim 8, wherein the processor is configured to automatically control the engine and/or the brake system to travel at the predetermined speed based on the speed of the vehicle detected by the speed sensor.

10. The system as set forth in claim 6, further comprising one or more attachment sensors in communication with the processor and configured to detect proper attachment of a trailer to the vehicle.

11. The system as set forth in claim 10, wherein the processor is configured to automatically control the powertrain and/or brake system is performed in response to receiving the command from the operator and the detection of the attachment of the trailer.

* * * * *